(No Model.)
A. KNAPP, Jr.
COMBINED HAND CORN PLANTER AND FERTILIZER DISTRIBUTER.
No. 473,760. Patented Apr. 26, 1892.
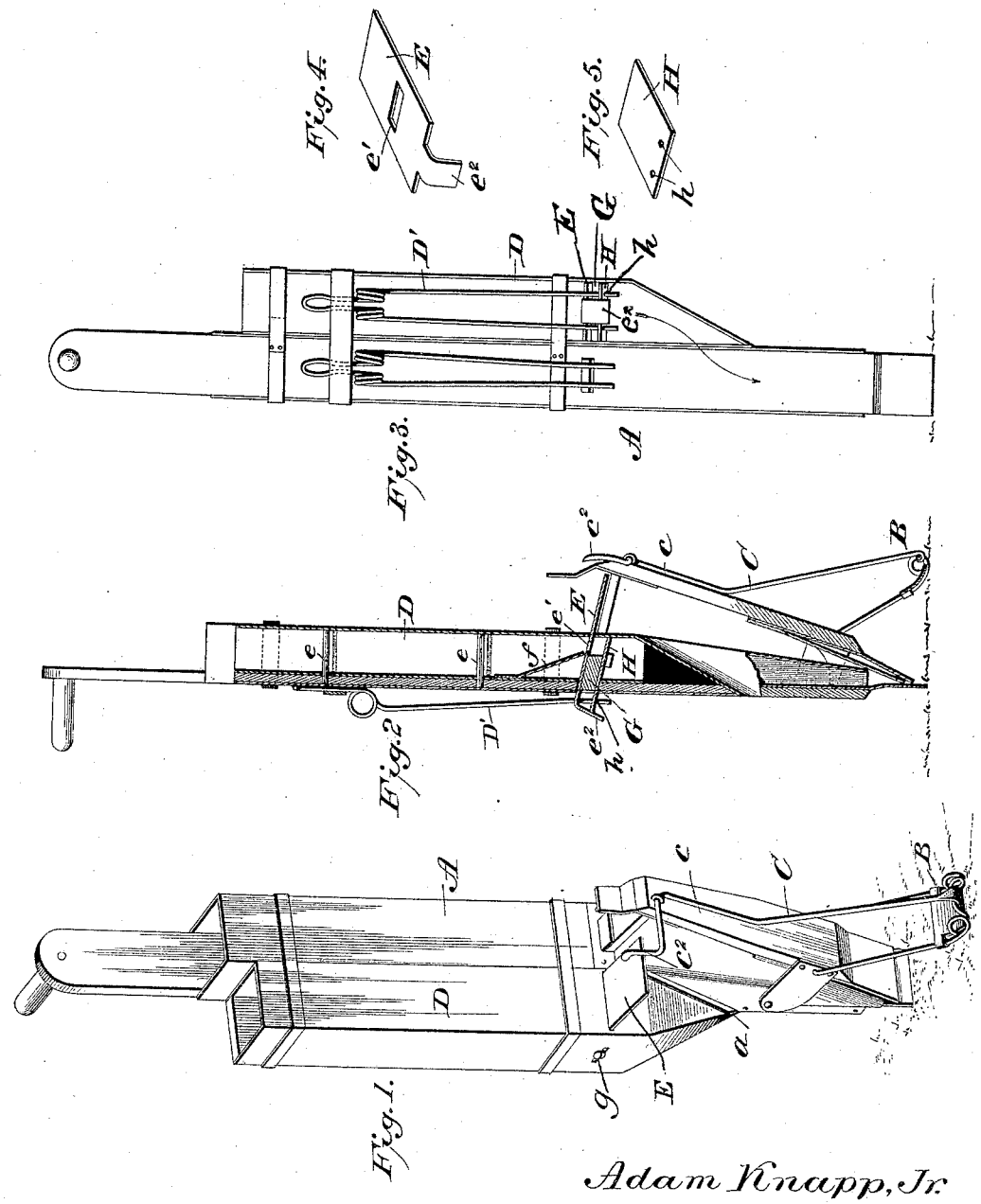
Adam Knapp, Jr.
Inventor
Witnesses
G. S. Elliott.
by
Attorney

UNITED STATES PATENT OFFICE.

ADAM KNAPP, JR., OF STRYKERSVILLE, NEW YORK.

COMBINED HAND CORN-PLANTER AND FERTILIZER-DISTRIBUTER.

SPECIFICATION forming part of Letters Patent No. 473,760, dated April 26, 1892.

Application filed January 21, 1892. Serial No. 418,836. (No model.)

*To all whom it may concern:*

Be it known that I, ADAM KNAPP, Jr., a citizen of the United States of America, residing at Strykersville, in the county of Wyoming and State of New York, have invented certain new and useful Improvements in a Combined Corn-Planter and Fertilizer-Distributer; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in combined hand seed-planters and fertilizer-distributers.

The object of the invention is to provide a combined implement for dropping corn or seed and fertilizing material at the same time and at one operation; and it consists in the construction and combination of the parts, as will be hereinafter fully set forth, and particularly pointed out in the claims.

In the accompanying drawings, forming part of this specification, Figure 1 is a perspective view of a seed-planter and fertilizer-distributer constructed in accordance with my invention. Fig. 2 is a vertical sectional view. Fig. 3 is a rear elevation. Figs. 4 and 5 illustrate detail views of the slide of the fertilizer-distributer detached.

A designates a hand seed-planter, which may be substantially of ordinary construction, except that the body portion of the same at one side is cut away to provide an aperture, through which the fertilizer from the carrier passes. The lower wall of this aperture, which is inclined, is bent outward, as shown at $a$, to provide a rest or bearing for the lower inclined end of the fertilizer-distributer.

B designates the foot of the planter, which is connected with the lever C in the usual manner, and the rod $c$ thereof has its upper end extended to one side and upward to operate the slide of the fertilizer-distributer by the same operation which oscillates the lever C, connected to the seed-slide. The fertilizer-distributer D may be connected to the hand-planter by fastening-bands when it is desirable to have the same detachable, or may be rigidly secured thereto, and this distributer consists of a casing having pins $e$ $e$ interiorly located, which will materally assist in preventing the fertilizer clogging, and above the slide is secured an inclined deflecting-plate $f$.

E designates an inclined slide having an aperture $e'$ and a bent end $e^2$, extending downward and reduced in width, as shown in Fig. 4. Immediately beneath the apertured slide E is placed a transverse block, which may be adjusted by means of a set-screw $g$, which engages with the block G and passes through an opening in the casing, and by adjusting this block the amount of fertilizer to be distributed can be regulated. Below the block G and suitably supported is a slide H of sufficient length to extend beyond the casing, and this slide is provided with apertures $h$ $h$, through which pass the ends of a spring D', said spring exerting a pressure to throw the slides in the position shown in Fig. 2 of the drawings. It will be noted that the apertured slide E passes through the casing D and projects, so that when the lever C is oscillated the upwardly-projecting end $c^2$ of the lever $c$ will contact with the same, so as to permit the fertilizer which has collected in the space between the slides to pass down into the seed-spout.

The hand-planter is operated in the usual manner, and the charge of fertilizer to be deposited above the seed is regulated by the block G.

It will be noted that in a planter and fertilizer-distributer constructed as herein described the seed is first dropped and retained between the plates at the lower end of the seed-planter, and that when the lever is operated the seed will be deposited in the ground, which operation also actuates the slide of the fertilizer and permits the charge therein to pass into the discharge-spout, so that it will be deposited above the seed, a quantity of earth usually falling over the seed, so that the fertilizer will not come in direct contact therewith.

Having thus described my invention, what I claim as new, and desire to secure by Letters Patent, is—

1. In combination with a hand-planter having an oscillating lever, a fertilizer-distributer carried by the hand-planter and provided with a spring-actuated slide, said slide being adapted to be operated in opposition to the spring when the lever is moved to actuate the seed-slide, substantially as shown, and for the purpose set forth.

2. In combination with a hand-planter having an aperture in one side of the same below the seed-slide, a fertilizer-carrier carried by the planter so as to connect with said aperture, the seed-slide and fertilizer-slide being adapted to operate in unison, a cut-off slide H, located below the slide E, and an interposed block, substantially as shown, and for the purpose set forth.

3. The combination, with a hand-planter constructed substantially as shown and provided with a bar $c$, having a bent end, and an aperture in the body portion of the seed-planter leading into the seed-spout below the seed-slide, of a fertilizer-distributer carried by the seed-planter and provided with slides which are spring-actuated in one direction and actuated in the opposite direction by contact with the operating-bar of the lever, substantially as shown, and for the purpose set forth.

4. In a combined planter and fertilizer-distributer constructed substantially as shown, the fertilizer-distributer having an apertured slide E, with a reduced end bent as shown, a slide H, located beneath the same, a spring D′, adapted to engage with the slide E and with apertures in the cut-off slide H, the depending end of the slide E also connecting with the cut-off slide H, and means which contact with the slide E to reciprocate the same in opposition to the spring, substantially as shown, and for the purpose set forth.

In testimony whereof I affix my signature in presence of two witnesses.

ADAM KNAPP, JR.

Witnesses:
FRANK GEORGE,
MIKAEL MINKEL.